United States Patent [19]
Childers et al.

[11] Patent Number: 6,034,696
[45] Date of Patent: Mar. 7, 2000

[54] SOURCE RELATIVE WARPING FOR CORNER PINNING

[75] Inventors: Donald Childers, Grass Valley, Calif.; John O'Halloran, Melboune Victoria, Australia

[73] Assignee: Grass Valley (U.S.) Inc., Nevada City, Calif.

[21] Appl. No.: 08/928,591

[22] Filed: Sep. 12, 1997

[51] Int. Cl.[7] .................................................. G06T 3/20
[52] U.S. Cl. ........................... 345/433; 345/139; 348/580; 382/295
[58] Field of Search ................................. 345/139, 145, 345/433; 382/293, 294, 295, 296; 348/578, 580, 585, 590, 593

[56] References Cited

U.S. PATENT DOCUMENTS

| | | | |
|---|---|---|---|
| 4,951,040 | 8/1990 | McNeil et al. | 340/729 |
| 5,848,199 | 12/1998 | Naqvi | 382/293 X |

OTHER PUBLICATIONS

"Mathematical Elements for Computer Graphics" Second Edition by David F. Rogers and J. Alan Adams, McGraw–Hill, Inc.

Second Edition "Computer Graphics" Principles and Practice by James D. Foley, Andries van Dam, Steven K. Feiner and John F. Hughes, Addison–Wesley Publishing Company.

*Primary Examiner*—Mark R. Powell
*Assistant Examiner*—Chanté Harrison
*Attorney, Agent, or Firm*—Francis I. Gray

[57] ABSTRACT

A source relative warping technique for corner pinning calculates a final projection matrix representing a desired video effect. At least three non-collinear points are specified in an input video signal representing an image in a source plane. One or more of the non-collinear points are "deformed", and then the points as deformed are processed by the final projection matrix to produce projected points in a target plane. A new projection matrix is defined that projects the original non-collinear points in the source plane onto the projected points in the target plane. The new projection matrix is finally substituted for the final projection matrix.

1 Claim, 1 Drawing Sheet

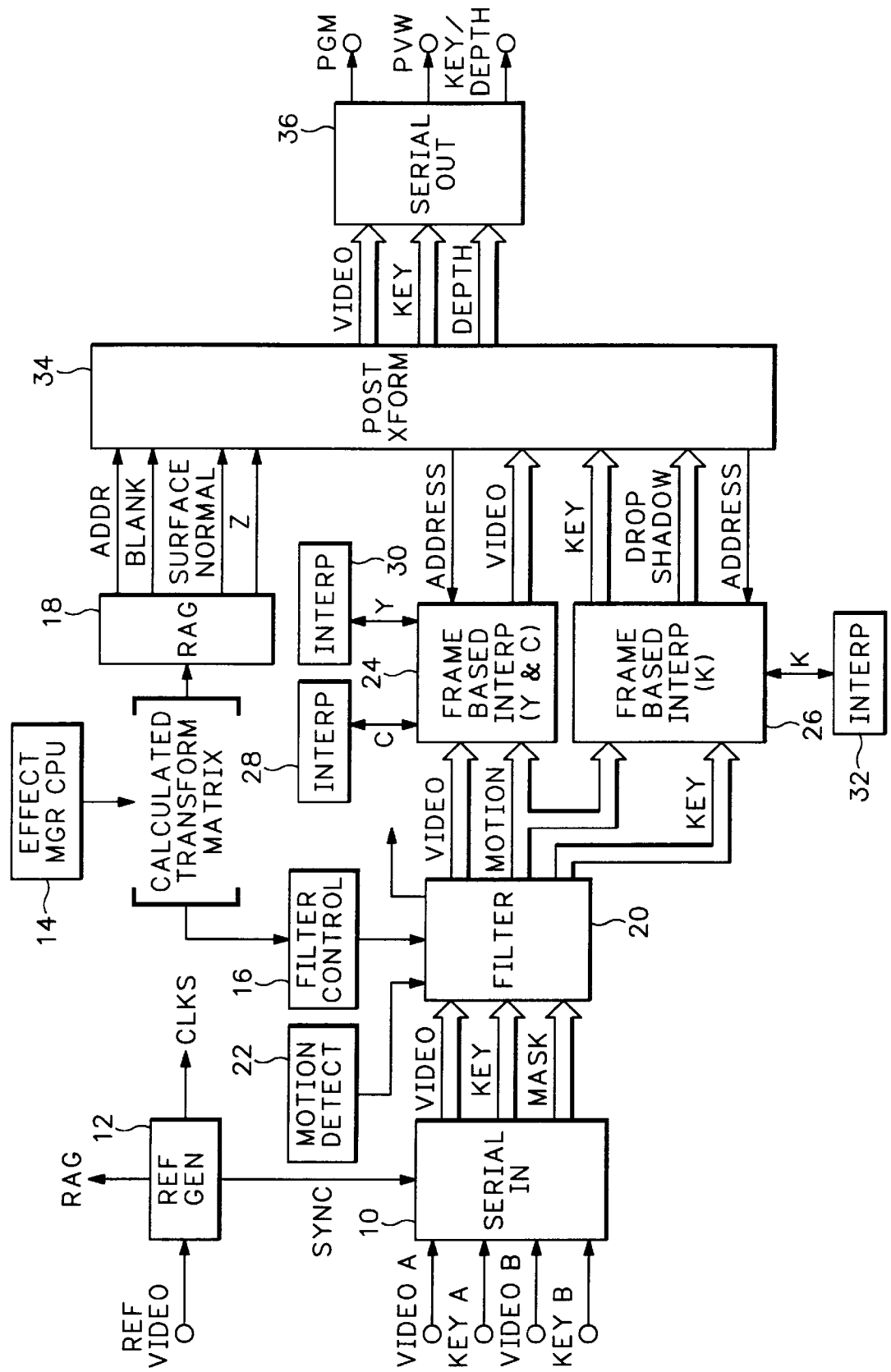

SOURCE RELATIVE WARPING FOR CORNER PINNING

CROSS-REFERENCE TO RELATED APPLICATIONS

Not applicable

STATEMENT REGARDING FEDERALLY SPONSORED RESEARCH OR DEVELOPMENT

Not applicable

BACKGROUND OF THE INVENTION

The present invention relates to digital video effects, and more particularly to a source relative warping technique for corner pinning a video image while retaining an existing transformation.

Computer graphics systems use a method of deforming images based upon matrix algebra. The objects are described in terms of homogeneous coordinates, then transformations based on 4×4 matrices are applied. A two-dimensional (2D) projection is used to create a final result. In the application of television imaging the use of dedicated hardware is used to achieve the desired result at a fast enough rate. Due to the fundamental time limitation imposed by the video refresh rate (1/60 second for NTSC and 1/50 second for PAL), specialized hardware is used to create the deformations in real time. This typically involves the use of two frame or field stores, one conceptually containing the "source" image and the other the "target" image. By adjusting the hardware addressing of the mapping from one image store to the other, arbitrary 2D projections may be achieved. The addresses are derived from a concatenated matrix representing the entire transformation process. In the case of television systems this usually involves inverting the matrix to represent the inverse process. This matrix is used to perform the operation "backwards", allowing pixels to be fetched from the source framestore while conceptually traversing the target framestore. As part of this operation pixels are usually fetched according to an additional "filter" criteria. Operationally the user is presented with whatever "handles" are appropriate to manipulate the image. These are often naked elements of the transformation matrices. The system generates the resulting concatenated matrix and determines the hardware clock coefficients on a field by field basis. This approach forms the backbone of current television graphics systems.

Because of the concatenations of the matrices, what is specified by several separate combinations is combined into one matrix representing the entire operation. While very efficient in terms of calculations, the result obscures the geometric significance of each separate operation. If the user wishes to disturb one corner of an image while keeping the other three fixed in space, it typically is necessary to modify the parameters that contribute to the projection itself.

One way to approach this problem involves back solving the transformation matrix on four points specified in target space, then choosing a subset of the constituent operations that produce the same result. This is not generally desirable due to the problem being inherently over specified. Unknown data parameters far outnumber the known data points. Accordingly a safe subset needs to be arbitrarily assigned and the remaining parameters determined. This destroys the original system geometry, typically imposing a new perspective and creating ambiguities in the area of concatenated image rotations.

What is desired is a way of creating an additional "controlled" deformation of a source image within an existing digital video effects system without requiring knowledge of the individual transformations that are required for a particular video effect.

BRIEF SUMMARY OF THE INVENTION

Accordingly the present invention provides a source relative warping technique for corner pinning by first calculating a final transformation matrix representing an overall projection process for a desired video effect and then specifying at least three non-collinear points in a source plane about the image to be deformed. A deformation is created by dragging one or more of the specified points in the source plane to a new position. The new points are then projected via the final transformation matrix onto a target plane. Using these projected points a projection matrix is derived by back solving using the original specified points. This yields a different matrix that represents the transformation matrix needed to produce the illusion that the "shape" of the image in the source plane has been altered. The different matrix is finally substituted for the original, finally calculated one.

The objects, advantages and other novel features of the present invention are apparent from the following detailed description when read in conjunction with the appended claims and attached drawing.

BRIEF DESCRIPTION OF THE SEVERAL VIEWS OF THE DRAWING

The Figure is a block diagram of a digital video effects apparatus that implements a source relative warping technique for corner pinning according to the present invention.

DETAILED DESCRIPTION OF THE INVENTION

Referring now to the Figure video signals VIDEO_A, VIDEO_B in a standard serial digital format with associated key signals or masks KEY_A, KEY_B are input to a serial input processing circuit 10 where the serial digital video is converted to parallel digital video among other operations such as mixing, layering, etc. A reference video signal, such as studio black, is input to a reference generator 12 to generate the necessary timing signals, including a sync signal that provides timing for the serial input processing circuit 10. An effects management central processing unit (CPU) 14 provides a calculated transformation matrix from which filter coefficients are provided to a filter control circuit 16 and transformation coefficients are provided to a reverse address generator 18. The calculated transformation matrix is the concatenation of all the individual transformations that make up a particular video effect, including the final 2D projection onto the target plane.

The filter control circuit 16 controls a filter circuit 20 according to the filter coefficients and a motion control signal from a motion detector 22. The filter circuit 20 provides filtered video, motion and key/mask signals as outputs. The filtered video and motion signals are input to a first frame store/interpolation circuit 24, while the motion and key/mask signals are input to a second, parallel frame store/interpolation circuit 26. The two frame store circuits 24, 26 represent source space. When addressed for output, the frame store/interpolation circuits 24, 26 provide for each address in target space a group of values to respective C, Y and K interpolators 28, 30, 32 that provide the values of C, Y and K for that address. The addresses are generated by the reverse address generator 18 and provided to the frame store/interpolation circuits 24, 26 via a post transform circuit 34. The resulting interpolated, target space video, key and drop shadow signals are returned to the post transform circuit 34 where they are converted into output video, key and depth signals. These signals are input to a serial output processing circuit 36 to provide a program video signal PGM, a preview video signal PVW and a combined key/depth signal.

To pre-pend a deformation to an existing transformation matrix that provides transformation coefficients to the reverse address generator 18, the following steps are followed by the effects manager CPU 14:

1. Calculate a final matrix representing an overall projection process and specify at least three non-collinear points in a plane of a source system, such as the corners of an image or any quadrilateral in the source plane.
2. Create the deformation by dragging any, or all, of the points in the source plane.
3. Project the new points through the existing transformation matrix, resulting in a further four points projected in target space.
4. Using the projected points, back solve for a projection matrix using the original four points instead, which yields a different matrix that represents what the transformation matrix needs to do to produce the illusion that the "shape" of the source image has been altered.
5. Substitute the different matrix for the original, normally calculated one.

Example:

Let P(1) through P(4) represent four original points in source space. For convenience in this example these points are the corners of a television raster based upon a geometry of 8×6 where the origin is the center of the image.

$$P(1)=[4, 3]$$
$$P(2)=[-4, 3]$$
$$P(3)=[-4,-3]$$
$$P(4)=[4,-3]$$

Let [M] be an arbitrary 4×4 projection matrix of the form $$[M] = \begin{vmatrix} A & B & 0 & D \\ E & F & 0 & H \\ 0 & 0 & 0 & 0 \\ M & N & 0 & 1 \end{vmatrix}$$

The source image is "deformed" by specifying a new set of points which are considered to be a source transformation of the original values:

$$P'(1)=[x1,y1]$$
$$P'(2)=[x2,y2]$$
$$P'(3)=[x3,y3]$$
$$P'(4)=[x4,y4]$$

Projecting these points with [M] yields $$Pt(1)=[xt1,yt1]$$
$$Pt(2)=[xt2,yt2]$$
$$Pt(3)=[xt3,yt3]$$
$$Pt(4)=[xt4,yt4]$$

where $$xt1=(A*x1+E*y1+M)/(D*x1+H*y1+1)$$
$$yt1=(B*x1+F*y1+N)/(D*x1+H*y1+1)$$
$$xt2=(A*x2+E*y2+M)/(D*x1+H*y2+1)$$
$$yt2=(B*x2+F*y2+N)/(D*x2+H*y2+1)$$
$$xt3=(A*x3+E*y3+M)/(D*x3+H*y3+1)$$
$$yt3=(B*x3+F*y3+N)/(D*x3+H*y3+1)$$
$$xt4=(A*x4+E*y4+M)/(D*x4+H*y4+1)$$
$$yt1=(B*x4+F*y4+N)/(D*x4+H*y4+1)$$

A matrix [N] is defined that projects the original four points P(1)–P(4), but still yields Pt(1)–Pt(4), as follows:

$$[N] = \begin{vmatrix} a & b & 0 & d \\ e & f & 0 & h \\ 0 & 0 & 0 & 0 \\ m & n & 0 & 1 \end{vmatrix}$$

By instead projecting the original points P(1)–P(4)

$$xt1=(4*a+3*e+m)/(4*d+3*h+1)$$
$$yt1=(4*b+3*f+n)/(4*d+3*h+1)$$
$$xt2=(-4*a+3*e+m)/(-4*d+3*h+1)$$
$$yt2=(-4*b+3*f+n)/(-4*d+3*h+1)$$
$$xt3=(-4*a+3*e+m)/(-4*d-3*h+1)$$
$$yt3=(-4*b+3*f+n)/(-4*d-3*h+1)$$
$$xt4=(4*a-3*e+m)/(4*d-3*h+1)$$
$$yt4=(4*b-3*f+n)/(4*d-3*h+1)$$

Equating the eight expressions for (xt,yt) gives a simple set of simultaneous equations that yield the eight elements of [N]. Then use [N] in place of [M].

The source deformation is totally independent and upstream of all the transformations that follow. Any three dimensional operations performed on the image continue to behave in a predictable manner, and none of the user's handles change in behavior. For example, the image may still be rotated and moved about in three-dimensional (3D) space without any change in perspective or in the relative size/orientation of the image relative to other "channels", i.e., other digital video effects devices that are being used in tandem.

Thus the present invention provides a source relative warping technique for corner pinning by specifying new corner points in the source plane, dragging one or more of the points according to a desired deformation and projecting the effect through an original projection matrix, then back-solving to the original points in the source plane to obtain a new projection matrix which is substituted for the original projection matrix.

We claim:

1. A method of corner pinning a video image using a digital effects apparatus comprising the steps of:

calculating a final projection matrix that produces a desired video effect upon an input video image signal from a source plane, the desired video effect being displayed on a target plane;

specifying a plurality of non-collinear points in the source plane;

dragging at least one of the non-collinear points to produce a set of deformed points representing a desired deformation;

transforming the deformed points via the final projection matrix to produce projected points in the target plane;

backsolving to form a new projection matrix that projects the non-collinear points onto the projected points in the target plane; and substituting the new projection matrix for the final projection matrix.

* * * * *